United States Patent [19]

Mendiola, Jr.

[11] Patent Number: 5,429,029

[45] Date of Patent: Jul. 4, 1995

[54] GUITAR SCALE CALCULATOR

[76] Inventor: Travis C. Mendiola, Jr., 347 Monticello, San Antonio, Tex. 78223

[21] Appl. No.: 863,029

[22] Filed: Apr. 3, 1992

[51] Int. Cl.⁶ .............................................. G09B 15/02
[52] U.S. Cl. ............................... 84/471 R; 84/485 R
[58] Field of Search .................. 84/470 R, 471 R, 472, 84/473, 485 R, 485 SR, 314 R, 315

[56] References Cited

U.S. PATENT DOCUMENTS

| | | | |
|---|---|---|---|
| 3,668,967 | 6/1972 | Malis | 84/471 |
| 4,995,183 | 2/1991 | Aiken | 40/518 |
| 5,029,507 | 7/1991 | Bezeau | 84/485 SR |
| 5,113,739 | 5/1992 | Thomason | 84/473 |

Primary Examiner—M. L. Gellner
Assistant Examiner—P. Stanzione
Attorney, Agent, or Firm—Gunn, Lee & Miller

[57] ABSTRACT

The guitar scale calculator device of the present invention has a longitudinal housing with a longitudinal open window. A scroll is disposed within the housing and is visible through the open window of the housing. The scroll contains a first indicia indicating a finger placement pattern for playing at least one preselected musical scale in selected tonics and indicating a key note location of the finger placement pattern for each of the preselected musical scales. A clear overlay is positioned and attached within the open window of the longitudinal housing and is constructed of a material which permits seeing the scroll through the overlay. The overlay contains a second indicia indicating a simulated fret board with scale tone letters for the finger placement pattern for each of the preselected musical scales.

5 Claims, 4 Drawing Sheets

GUITAR SCALE CALCULATOR

SUMMARY OF THE INVENTION

The present invention is a musical training device for the six string guitar or the bass guitar. This device will permit the student of the guitar or bass guitar and composers of music to determine each and every tone of any musical scale, while simultaneously determining on which keys or frets of the instrument are to be played in order to produce each of the tones of the desired musical scale.

When a person is learning to play the guitar or bass guitar, he or she must understand the musical scales and then learn the fingering positions for each scale.

The guitar scale calculator of the present invention will help the user learn the pattern of the scales in relation to the frets of the instrument, learn how the pattern moves and learn the fingering positions required to play the notes. The guitar scale calculator is a learning tool for playing the guitar which shortens and simplifies the learning process.

With the incorporation of a scroll for displaying the fingering patterns and notes of any number of different scales into the guitar scale calculator, the present invention provides the advantages of storing a large amount of information without the use of electronics. Thus, the guitar scale calculator of the present invention is affordable and practical. It provides a superior design over the slide rule type of guitar scale calculators in which the slides can either be lost or damaged. Further, the amount of information which can be contained on the slide rule type is very limited in comparison to the guitar scale calculator of the present invention and there is too much information on the slide rule type which can be confusing to the user.

The guitar scale calculator of the present invention is composed of a housing with an open window. The length of the housing is sufficient to display the frets on the neck of a guitar or a bass guitar. A clear overlay is attached to the inside of the open window of the housing and contains the numbered frets of the neck of the instrument and the location of the notes on the frets and strings of the instrument. A scroll attached to two rollers is aligned under the clear overlay. The two rollers are positioned inside the housing and at opposite ends of the housing. The two rollers are connected to two roller cranks positioned on the outside of the housing which allows the user to turn the roller cranks to access the desired information on the scroll. The scroll contains a series of open and shaded dots indicating the location of all of the tones of a particular musical scale. The open and shaded dots on the scroll disclose the fingering pattern and the key note locations for a particular musical scale.

DETAILED DESCRIPTION OF THE PREFERRED EMBODIMENT

A preferred embodiment dealing with musical scales in relation to the six stringed guitar and the Bass guitar, by way of example will be described with reference to the accompanying drawings.

Figure 1:
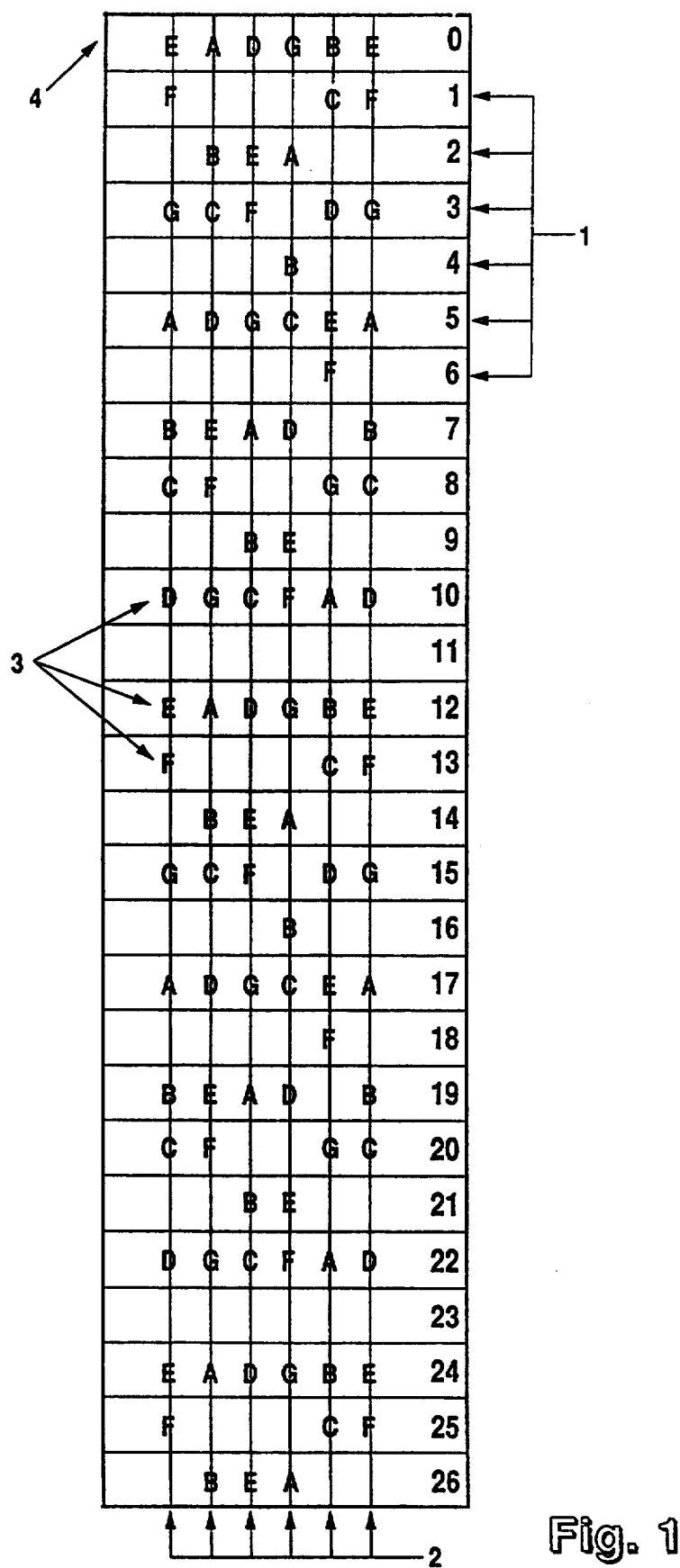
FIG. 1 is a plan view of the clear overlay according to a first preferred embodiment of the present invention.

FIG. 1 shows the clear overlay (4) which displays the location of the notes on the fret board of the guitar neck for a particular musical scale. The frets (1) of the guitar neck are numbered 1-26 and the six strings (2) of the guitar are shown with the location of the notes (3) indicated by letters where the frets (1) intersect with the strings (2). This clear overlay (4) is mounted on the inside of the open window of the housing (10) which will be discussed in more detail in referring to FIG. 3.

Figure 2:
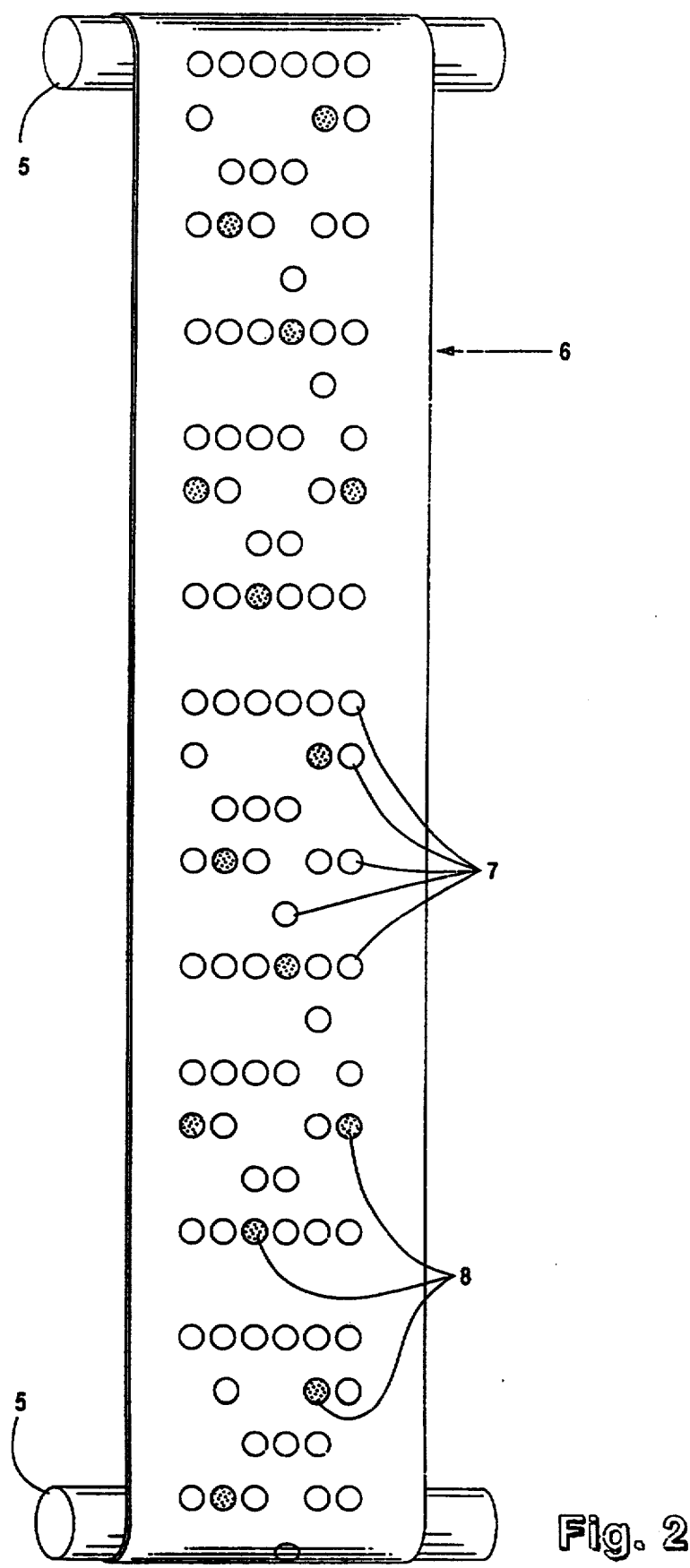
FIG. 2 is a perspective view of the scroll according to the first preferred embodiment of the present invention.

FIG. 2 shows a scroll (6) which is wrapped around a set of rollers (5) at each of its ends. The scroll (6) displays open dots (7) which indicate the location of tones of a given musical scale and colored dots (8) which indicate a given key or tonic note of the musical scale. Red is the preferred color for the colored dots (8). The open dots (7) and colored dots (8) show the user the finger placement pattern to be used when playing the guitar in a particular musical scale.

Figure 3:
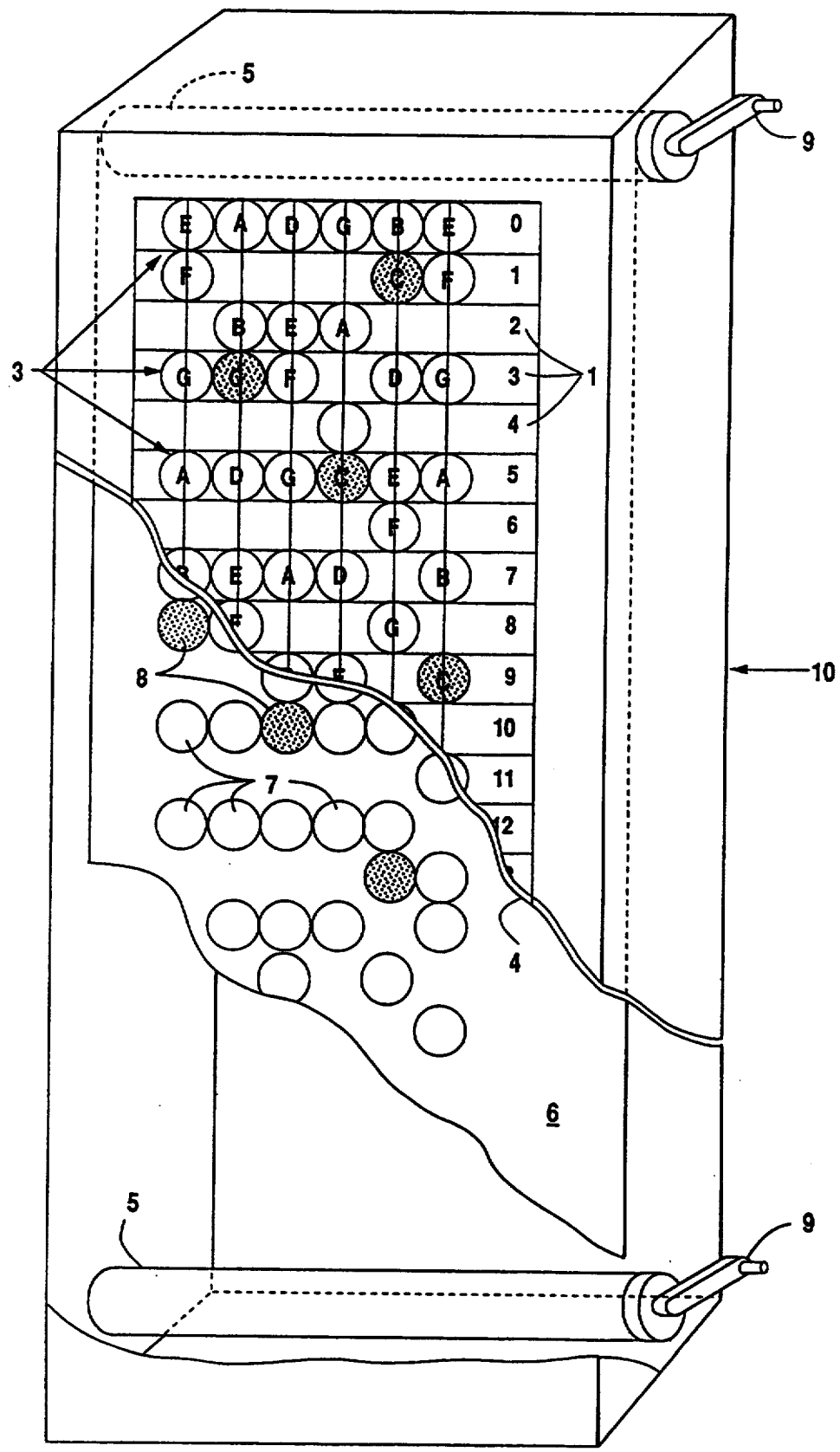
FIG. 3 is a cut away perspective view of the first preferred embodiment of the present invention.

FIG. 3 shows a cutaway perspective view of the device of the present invention for use in playing a six string guitar. The housing (10) has an open window into which the clear overlay (4) is glued from the inside of the housing (10). The scroll (6) with its set of rollers (5) is placed inside the housing (10) and the rollers (5) are connected to a pair of roller cranks (9) which are located outside of the housing (10). The roller cranks (9) allow the scroll (6) to be turned from the outside of the housing (10) to bring the desired information on the scroll (6) into the open window of the housing (10).

Figure 4:
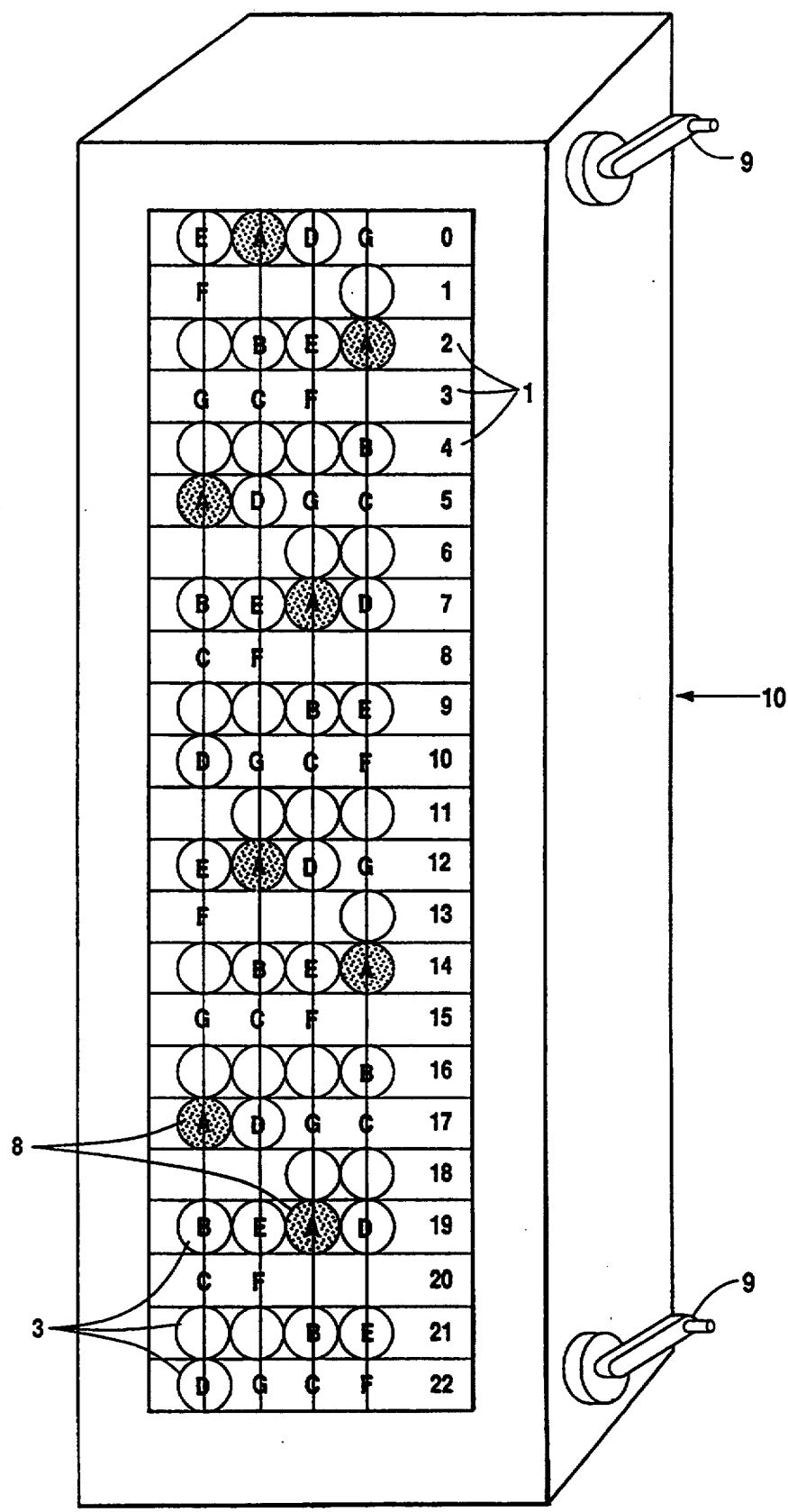
FIG. 4 is a perspective view of a second preferred embodiment of the present invention.

FIG. 4 shows a device of the present invention for use in playing a bass guitar. This device is basically the same device as shown in FIG. 3, having a housing (10), frets (1), the clear overlay (4) showing the location of the notes (3) and the color dots (8) designating the key notes. The only differences between this preferred embodiment and the other preferred embodiment of the invention for use in playing a six string guitar is that the bass guitar neck only has twenty-two frets and four strings. Therefore the clear overlay (4) and scroll (6) are modified accordingly.

What is claimed:

1. A musical scale determining device for use in playing a guitar comprising:
   a longitudinal housing having a first and a second end, a longitudinal open window disposed between said first and said second end and a first and a second roller crank with the first roller crank located at the first end of said housing and the second roller crank located at the second end of said housing;
   a scroll disposed within said housing and visible through said open window of said housing, said scroll having a first and a second end and a first and a second roller, wherein said first end of said scroll is attached to said first roller and said second end of said scroll is attached to said second roller, wherein said scroll contains a first indicia indicating at least five separate finger placement patterns for playing preselected musical scales in selected tonics and indicating a key note location of said finger placement patterns for each of said preselected musical scales; wherein said first and second rollers are connected to said roller cranks of said housing; and a clear overlay positioned and attached within said open window of said housing in coordination with said scroll, said overlay being constructed of a material which permits seeing said scroll through said overlay; wherein said overlay contains a second indicia indicating a simulated fret board with scale tone notes for said finger placement pattern for each of said preselected musical scales.

2. The musical scale determining device of claim 1, wherein said five separate finger placement patterns for playing preselected musical scales in selected tonics are major, minor, major penatonic, minor penatonic and blues scales.

3. The musical scale determining device of claim 1, wherein said scale tone notes are arranged in a major scale sequence on said overlay.

4. The musical scale determining device of claim 1, wherein said guitar is a six string guitar or bass guitar.

5. A method of using the musical scale determining device of claim 1 when learning to play a guitar comprising:

turning said first roller crank or said second roller crank to which said scroll is attached to align said key note location of said finger placement pattern with a tonic note of one preselected musical scale on said overlay to determine the finger placement pattern for playing said preselected musical scale in a particular key.

* * * * *